United States Patent
Inaba

(10) Patent No.: US 10,529,125 B2
(45) Date of Patent: Jan. 7, 2020

(54) IMAGE PROCESSING DEVICE AND METHOD THEREFOR

(71) Applicant: CANON KABUSHIKI KAISHA, Tokyo (JP)

(72) Inventor: Midori Inaba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/254,827

(22) Filed: Jan. 23, 2019

(65) Prior Publication Data

US 2019/0156561 A1    May 23, 2019

Related U.S. Application Data

(63) Continuation of application No. 15/378,216, filed on Dec. 14, 2016, now Pat. No. 10,229,530.

(30) Foreign Application Priority Data

Jan. 19, 2016    (JP) .................................. 2016-008281

(51) Int. Cl.
    *G06T 15/50*    (2011.01)
    *G06T 7/90*    (2017.01)
    *G06T 15/04*    (2011.01)
    *G06T 15/80*    (2011.01)

(52) U.S. Cl.
    CPC .............. *G06T 15/506* (2013.01); *G06T 7/90* (2017.01); *G06T 15/04* (2013.01); *G06T 15/80* (2013.01)

(58) Field of Classification Search
    None
    See application file for complete search history.

(56) References Cited

U.S. PATENT DOCUMENTS

| 6,983,082 B2 | 1/2006 | Duiker |
| 6,990,230 B2 | 1/2006 | Piponi |
| 7,079,137 B2 | 7/2006 | Borshukov |
| 7,536,047 B2 | 5/2009 | Borshukov et al. |

(Continued)

FOREIGN PATENT DOCUMENTS

| JP | 2006-506742 A | 2/2006 |
| WO | 2004/047009 A2 | 6/2004 |

OTHER PUBLICATIONS

Pixelation, "Correcting Skin Color / Skin Tones in Lightroom", https://pixelationblog.wordpress.com/2009/07/15/correcting-skin-color-skin-tones-in-lightroom/ 2009. (Year: 2009).*

(Continued)

*Primary Examiner* — Nicholas R Wilson
(74) *Attorney, Agent, or Firm* — Venable LLP

(57) ABSTRACT

An image processing device comprises a first input unit configured to input first information indicating a fine irregularity of a surface of a body to be rendered; a generation unit configured to generate, as pieces of information each indicating a tilt of a surface of an object to be rendered, pieces of second information for respective wavelengths from the first information; a rendering unit configured to render objects for the respective wavelengths based on the pieces of second information for the respective wavelengths; and a combining unit configured to generate an image of the body to be rendered by combining the objects for the respective wavelengths.

11 Claims, 13 Drawing Sheets

(56) References Cited

U.S. PATENT DOCUMENTS 8,515,157 B2 8/2013 Borshukov et al.
2004/0169656 A1 9/2004 Piponi et al.

OTHER PUBLICATIONS

Jensen et al., "A Spectral BSSRDF for Shading Human Skin", Eurographics Symposium on Rendering, 2006. (Year: 2006).*
Tabellion et al., "An Approximate Global Illumination System for Computer Generated Films," ACM, 2004. (Year: 2004).*
Tim Weyrich, et al., "Analysis of Human Faces using a Measurement-Based Skin Reflectance Model," ACM, 2006, pp. 1013-1024.
Hendrik Lensch, et al., "Image-Based Reconstruction of Spatially Varying Materials," 2001.

* cited by examiner

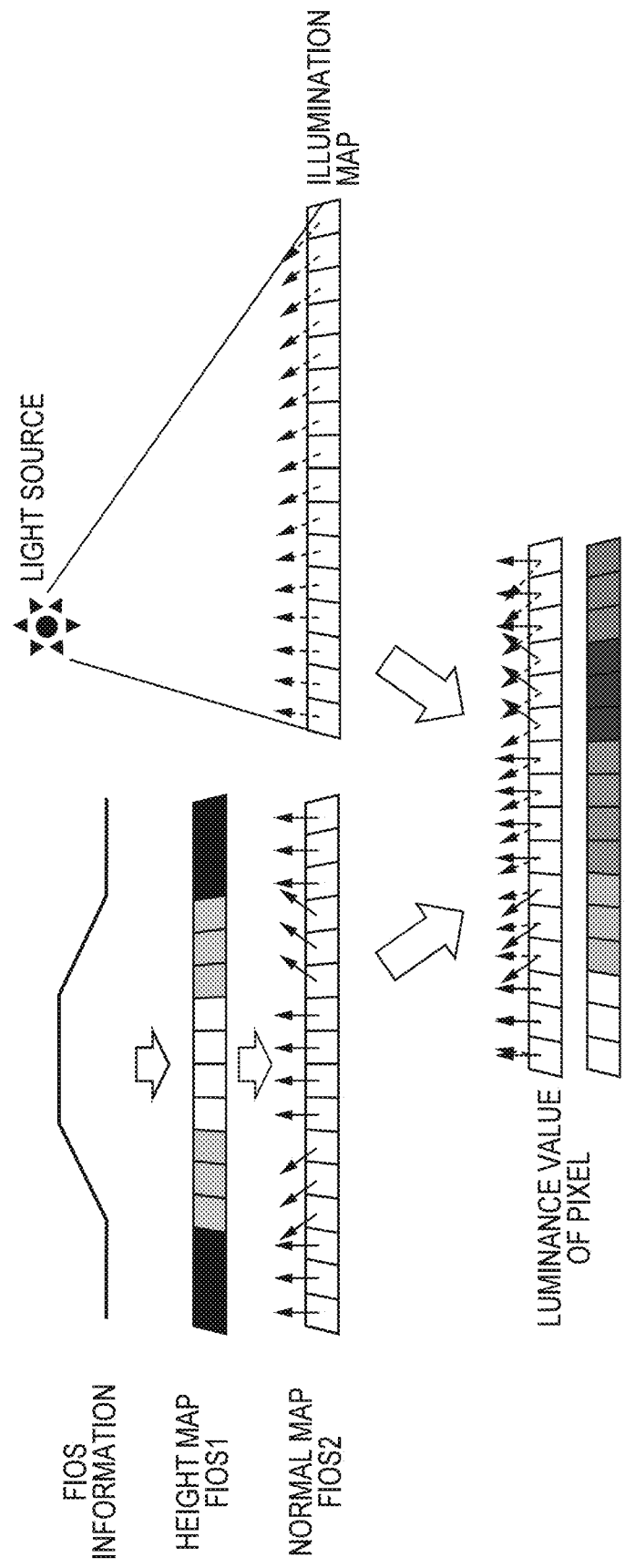

F I G. 7A
| WAVELENGTH λi [nm] | MAXIMUM HEIGHT VALUE |
|---|---|
| w1 | h1 |
| w2 | h2 |
| w3 | h3 |
F I G. 7B
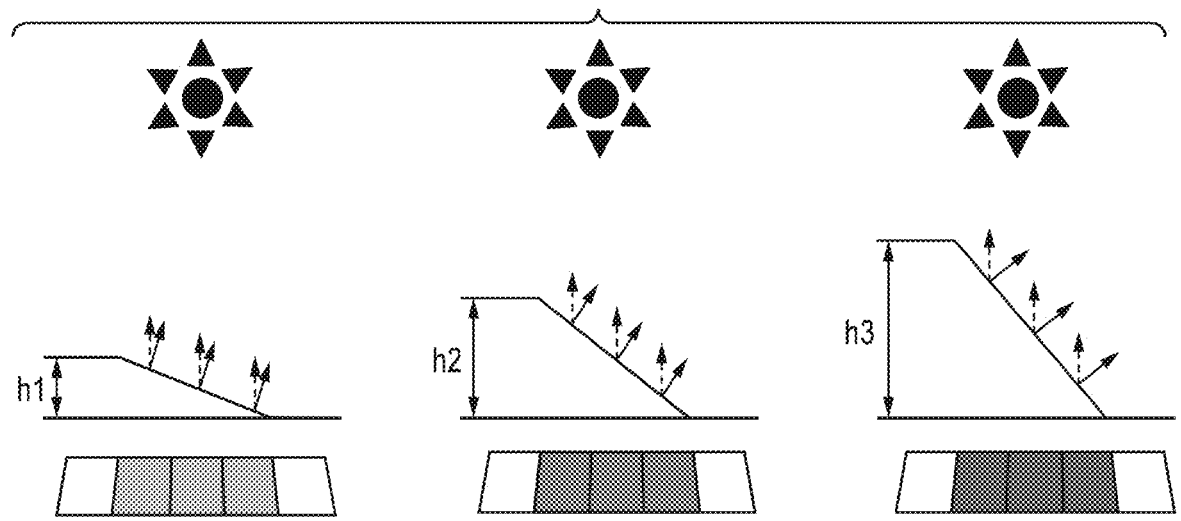
F I G. 7C
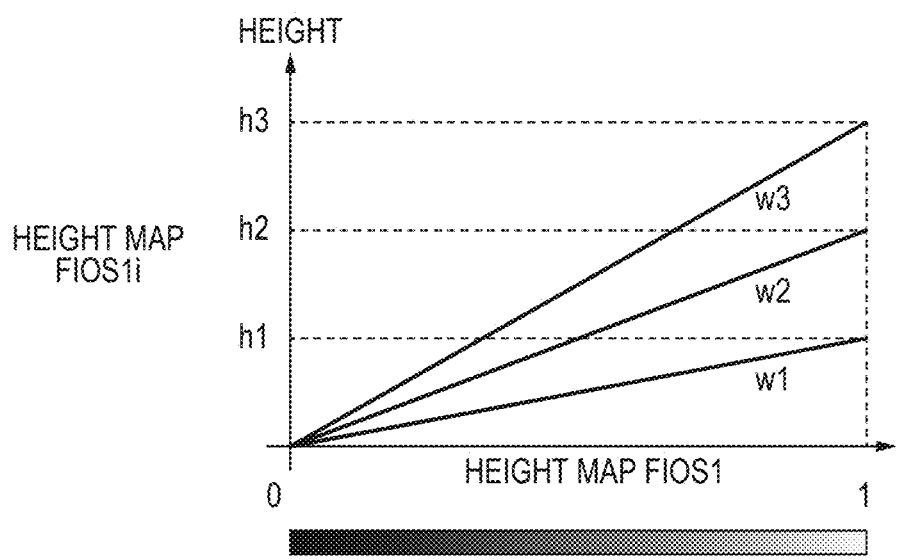

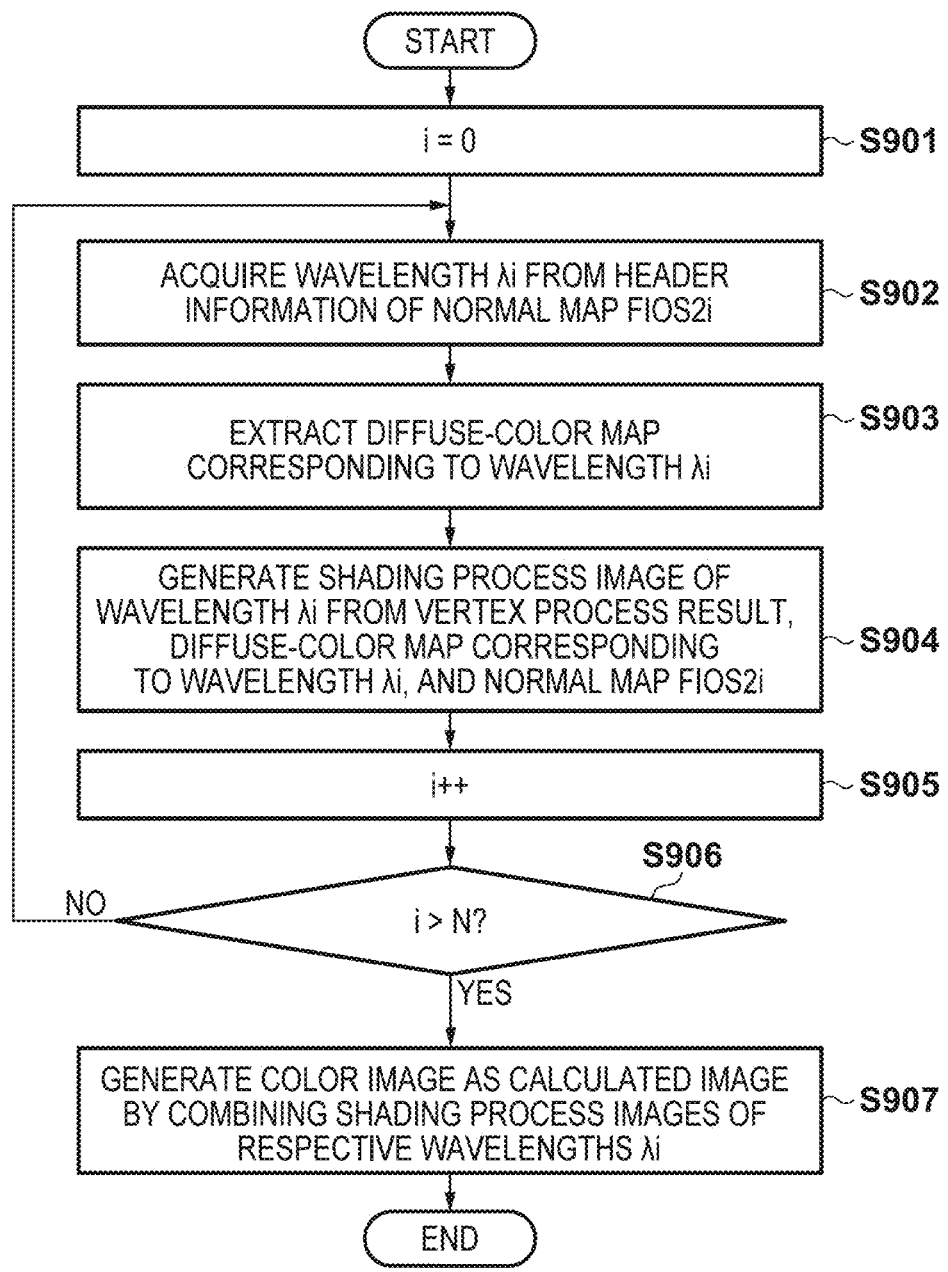

IMAGE PROCESSING DEVICE AND METHOD THEREFOR

This application is a continuation of application Ser. No. 15/378,216 filed Dec. 14, 2016.

BACKGROUND OF THE INVENTION

Field of the Invention

The present invention relates to an image process of reconstructing a translucent body in consideration of internally-scattered light.

Description of the Related Art

In recent years, in the computer graphics (CG) field, a technique of rendering a translucent body not only on the surface of which but also in which light is scattered has been developed. Especially for the human skin, not only reconstruction of internally-scattered light but also reconstruction of wrinkles, pores, and the like on the surface is important, and thus the degree of difficulty of a rendering process is high. The surface shape of wrinkles, pores, and the like will be referred to as "the fine irregularity of a body surface (FIOS)" hereinafter. The translucent body is a body in which light is transmitted and scattered, such as a cloudy glass or plastic, a cloudy liquid, or a living cell.

As a method of reconstructing internally-scattered light, there is known a method disclosed in Japanese Patent Laid-Open No. 2006-506742. According to Japanese Patent Laid-Open No. 2006-506742, sampling is performed at a plurality of points, and pixel values are integrated using a Bidirectional Scattering Surface Reflectance Distribution Function (BSSRDF), thereby performing a blurring process. There is also known a method of reconstructing internally-scattered light by performing a blurring process of a different blurring amount for each of the wavelength channels of the image values. As an FIOS reconstruction method, there is provided a process using a bump map representing a surface shape. If the human skin is reconstructed by CG, a blurring process is generally executed after an FIOS is reconstructed.

The appearance of a translucent body having an FIOS influenced by internally-scattered light will be described with reference to FIGS. 1A and 1B. FIGS. 1A and 1B each show the spread of internally-scattered light in the cross section direction when light enters a translucent body 101. As shown in FIG. 1A, if light enters the surface of the translucent body 101 in the vertical direction, exit light has a feature in which long-wavelength light R spreads more largely than short-wavelength light B.

On the other hand, FIG. 1B shows a case in which light obliquely enters the translucent body 101. Light which obliquely enters has a feature of spreading in the incident direction. Thus, the right portion (to be referred to as a cut portion hereinafter) of the translucent body 101 which has been obliquely cut is originally a portion where no light enters to generate a shadow. However, since internally-scattered light exits, the cut portion becomes bright. At this time, more long-wavelength light which more readily spreads exits from the cut portion, and the cut portion which serves as the shadow portion when there is no internally-scattered light is observed to be red and bright due to internally-scattered light. The cut portion which serves as the shadow portion when there is no internally-scattered light corresponds to an FIOS such as wrinkles and pores in the case of the human skin.

The technique described in Japanese Patent Laid-Open No. 2006-506742 cannot reconstruct the feature in which the FIOS becomes red and bright, since a blurring process is uniformly performed without considering the influence of the FIOS. Since the FIOS largely influences the appearance of the translucent body, it is necessary to faithfully reconstruct the feature (to be referred to as the brightness increase hereinafter) in which the FIOS becomes red and bright due to internally-scattered light.

SUMMARY OF THE INVENTION

According to one aspect of the present invention, a translucent body is reconstructed in consideration of internally-scattered light.

One aspect of the present invention has the following arrangement.

An image processing device comprising: a first input unit configured to input first information indicating a fine irregularity of a surface of a body to be rendered; a generation unit configured to generate, as pieces of information each indicating a tilt of a surface of an object to be rendered, pieces of second information for respective wavelengths from the first information; a rendering unit configured to render objects for the respective wavelengths based on the pieces of second information for the respective wavelengths; and a combining unit configured to generate an image of the body to be rendered by combining the objects for the respective wavelengths.

According to an exemplary aspect of the present invention, it is possible to reconstruct a translucent body in consideration of internally-scattered light. For example, it is possible to reconstruct the brightness increase of the fine irregularity of a body surface (FIOS) caused by internally-scattered light.

Further features of the present invention will become apparent from the following description of exemplary embodiments (with reference to the attached drawings).

BRIEF DESCRIPTION OF THE DRAWINGS

FIG. 5 is a view for explaining details of a normal mapping process;

FIGS. 7A, 7B, and 7C are views for explaining height information $\lambda$-h;

FIG. 9 is a flowchart for explaining a calculated image generation process by a calculated image generation unit;

DESCRIPTION OF THE EMBODIMENTS

An image processing device and an image processing method according to embodiments of the present invention will be described in detail below with reference to the accompanying drawings. Note that the embodiments are not intended to limit the present invention related to the scope of the claims, and not all of the combinations of arrangements set forth in the embodiments are necessarily required with respect to the means to solve the problems according to the present invention.

In recent years, there has been proposed an image processing method called rewriting of changing or adding illumination light for a captured image. The rewriting process performs a rendering process in a new illumination environment using the shape information of an object. Especially when performing the rewriting process of the human skin, an unnatural appearance different from the actual human skin is generated unless the influence of internally-scattered light is considered.

In the following embodiments, a translucent body reconstruction method considering the influence of internally-scattered light on the appearance of the fine irregularity of a body surface (FIOS) will be described. If, to faithfully reconstruct the human skin, an ideal FIOS shape (texture) is added to an image region where the human skin is captured, and the reconstruction method to be described in the embodiments is applied, it becomes possible to faithfully reconstruct internally-scattered light in the human skin.

First Embodiment

As the first embodiment, a translucent body reconstruction method using a rendering technique of changing, in accordance with a wavelength, information indicating the fine irregularity of the surface of a body (FIOS) to be rendered will be described.

[Device Arrangement]

Figure 1A:
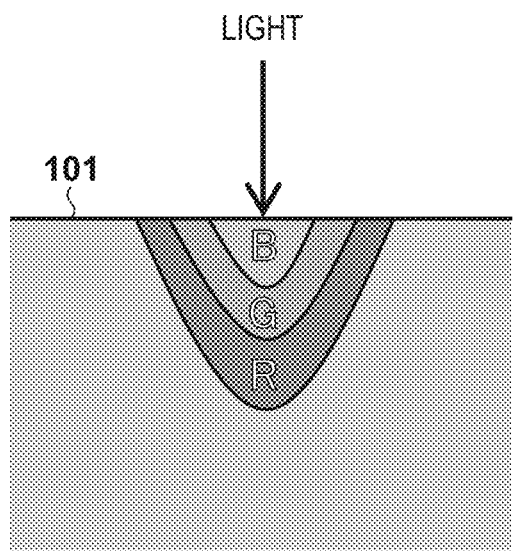
FIGS. 1A and 1B are views for explaining the appearance of a translucent body having an FIOS influenced by internally-scattered light.
Figure 1B:
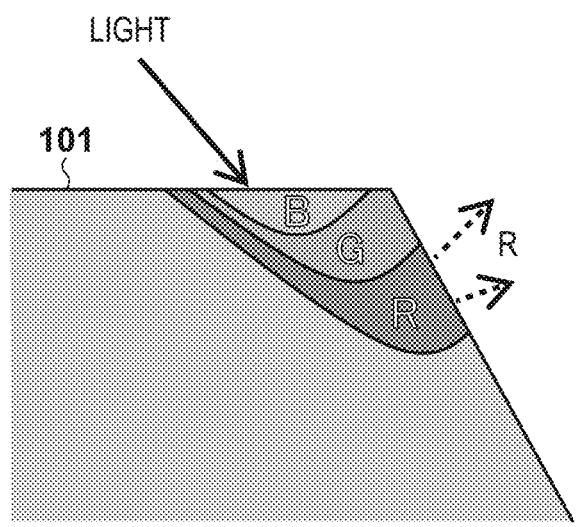
Figure 2:
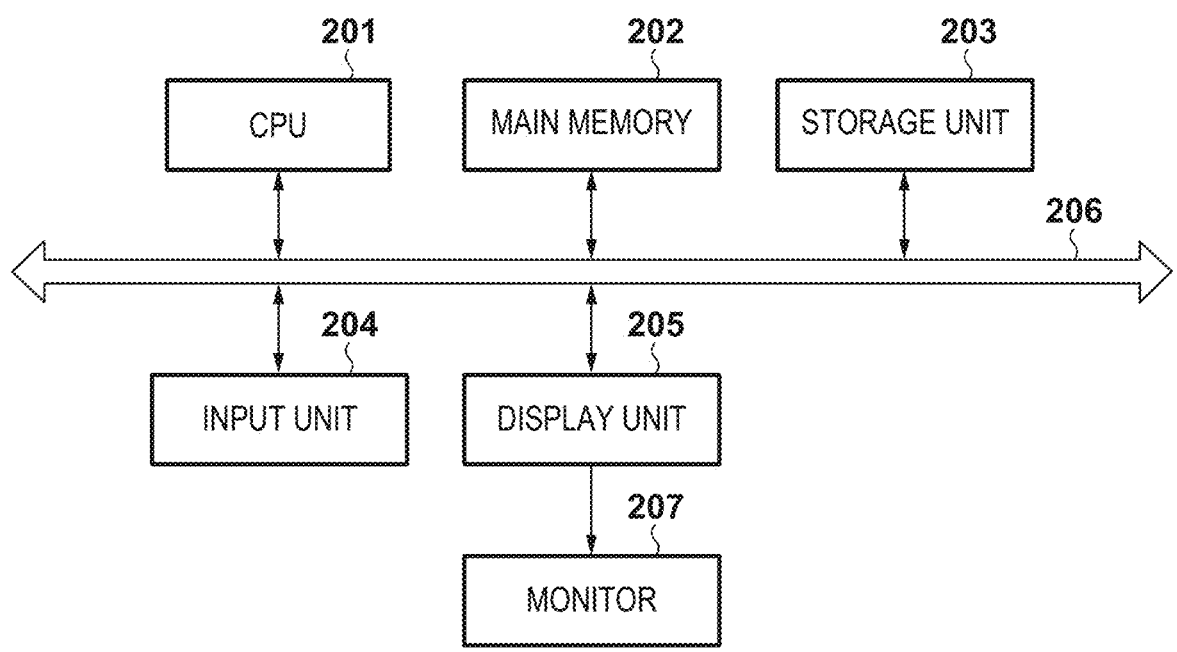
FIG. 2 is a block diagram showing an example of the arrangement of an information processing device functioning as an image processing device according to an embodiment.

FIG. 2 is a block diagram showing an example of the arrangement of an information processing device functioning as an image processing device according to the embodiment. A microprocessor (CPU) 201 executes programs and the like stored in a storage unit 203 using a main memory 202 as a work memory to execute various kinds of calculation processes, thereby controlling components (to be described later) via a system bus 206. The main memory 202 is formed from, for example, a random access memory (RAM) or a read only memory (ROM).

The storage unit 203 is a hard disk drive (HDD) or a solid state drive (SSD), and stores an image processing program, data representing a body to be rendered, the characteristic data of a light source, and the like. An input unit 204 is a keyboard, a mouse, or the like, and is a device used to input a user operation or user instruction. A display unit 205 displays, on a monitor 207 such as a liquid crystal panel, a user interface (UI) or an image generated by the CPU 201.

The information processing device serving as a computer device may include a network interface (not shown). In this case, the device can access a server device via a wired or wireless network, and acquire various kinds of programs and characteristic data from the server device or output calculation process results to the server device. The information processing device may be a tablet or smartphone which executes a program for implementing an image process (to be described later). In this case, the monitor 207 and the input unit 204 are provided as an integrated touch panel.

Image Processing Device

Figure 3:
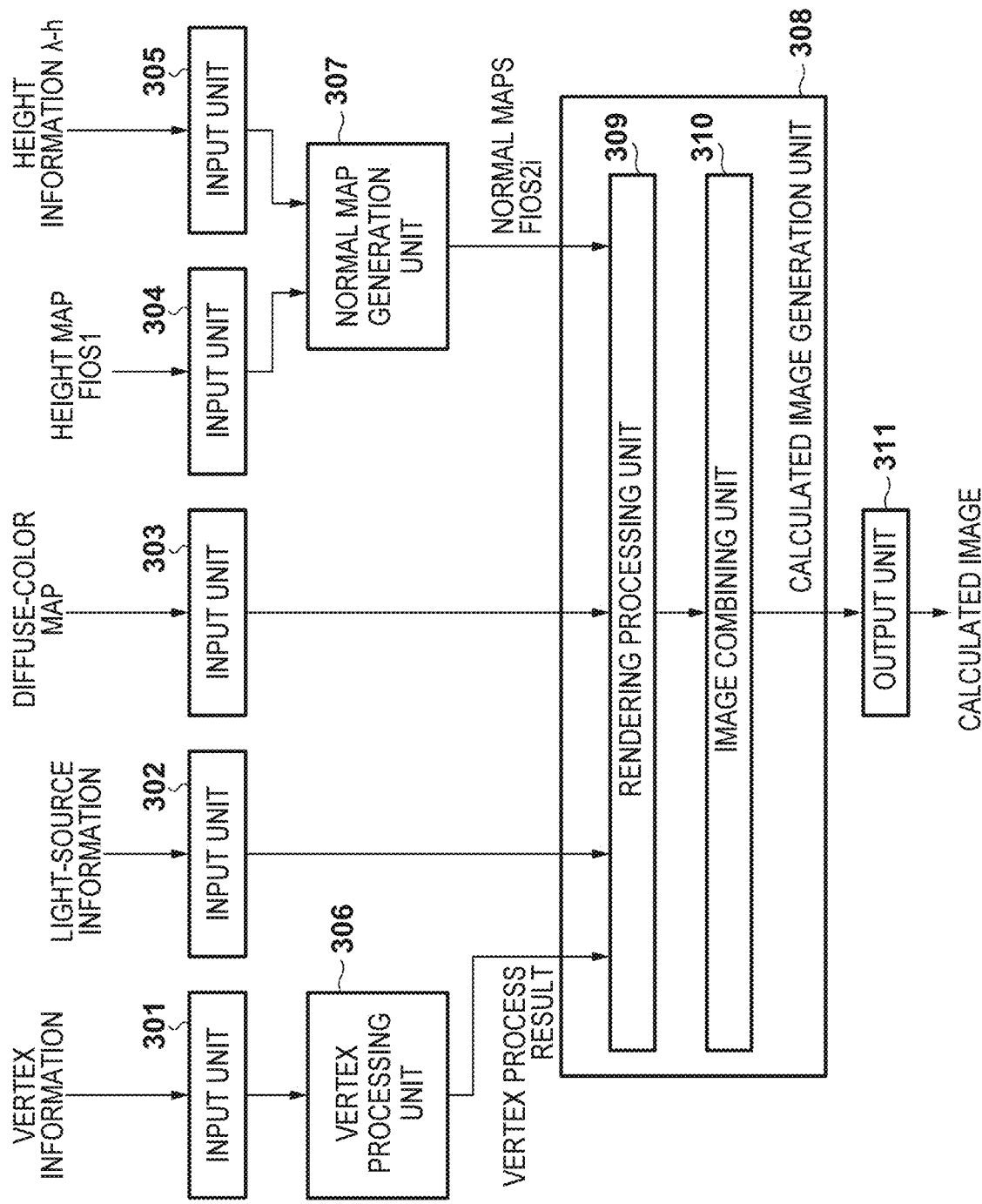
FIG. 3 is a view for explaining an example of the processing arrangement of the image processing device.

An example of the processing arrangement of the image processing device will be described with reference to FIG. 3. The processing arrangement shown in FIG. 3 is implemented when the CPU 201 executes the image processing program. Input units 301 to 305 respectively input the following pieces of information via the system bus 206.

The input unit 301 of vertex information inputs, from the storage unit 203 or the like, vertex information representing the shape of a body to be rendered. The input unit 302 of light-source information inputs light-source information from the storage unit 203, the input unit 204, or the like. The input unit 303 of diffuse-color information inputs, from the storage unit 203 or the like, a diffuse-color map representing the color of the body to be rendered. The input unit 304 of FIOS information inputs, as first information FIOS1 of an FIOS, from the storage unit 203 or the like, a height map (to be described in detail later) representing the relative height of the surface of the body to be rendered. The input unit 305 of height information λ-h inputs the height information λ-h (to be described in detail later) from the storage unit 203, the input unit 204, or the like.

A vertex processing unit 306 performs a vertex process based on the input vertex information, and outputs a vertex process result to a calculated image generation unit 308. A normal map generation unit 307 creates a normal map for each wavelength as second information FIOS2 of the FIOS based on the height map FIOS1 and the height information λ-h, and outputs normal maps FIOS2$i$ to the calculated image generation unit 308.

The calculated image generation unit 308 includes a rendering processing unit 309 and an image combining unit 310. The rendering processing unit 309 performs a rendering process including a shading process for each wavelength based on the vertex process result of the vertex processing unit 306, the light-source information, the diffuse-color map, and the normal map FIOS2$i$ for each wavelength, which has been input from the normal map generation unit 307. The image combining unit 310 generates a combined image by combining shading process images as objects for the respective wavelengths, which have been created by the rendering processing unit 309. The combined image is output from an output unit 311 as a calculated image representing the body to be rendered.

[Outline of Normal Mapping Method]

Since the FIOS is fine, if the FIOS is rendered using polygons, it becomes necessary to calculate an enormous amount of data. A method of reconstructing the FIOS by a small calculation amount is thus required. A normal mapping method is a method of reconstructing a pseudo FIOS using image data (normal map) storing normal directions instead of the polygons.

Figure 4A:
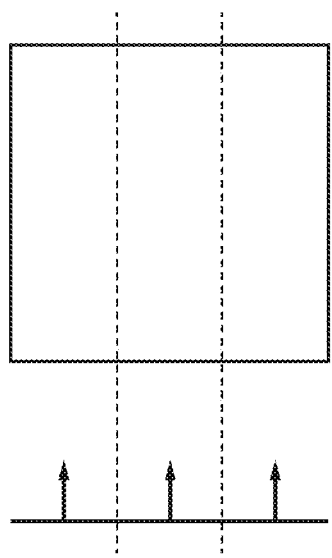
FIGS. 4A, 4B, and 4C are views for explaining an outline of a normal mapping method in a rendering process.
Figure 4B:
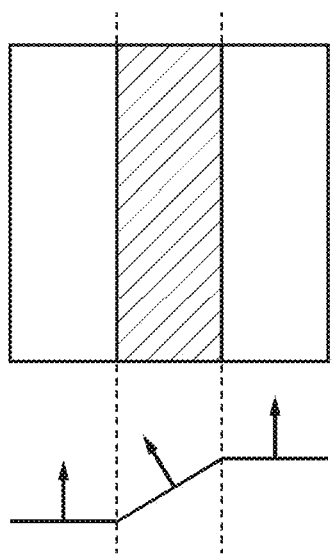
Figure 4C:
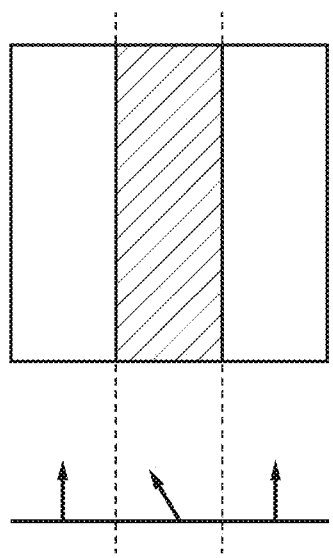

An outline of the normal mapping method in the rendering process will be described with reference to FIGS. 4A, 4B, and 4C. As shown in FIG. 4A, normals always face up on the plane. If, as shown in FIG. 4B, a slant is included, a tilt occurs between a normal on the slant and a normal on the plane. As shown in FIG. 4C, if the normal on the slant is assigned to the plane, a shadow is generated like the slant, and it is thus possible to give an appearance as if the slant existed even though it is the plane. In other words, the tilt of the surface of an object to be rendered can be expressed by a normal map. The accuracy of an object rendered by a normal mapping process depends on the density of the number of normals stored in the normal map.

The normal mapping process will be described in detail with reference to FIG. 5. The FIOS information includes, for example, "0.0" as a value indicating the same height as that of the reference surface of the body to be rendered, and "1.0" as a value indicating the highest position from the reference surface. The height map FIOS1 is grayscale data indicating a value of 0.0 to 1.0 of the FIOS information. For example, the bottom (deepest portion) of the FIOS of the body to be rendered is set as the reference surface. Alternatively, FIOS information may be created by setting, as the reference surface, the average surface of the body to be rendered except for the FIOS. In this case, since the FIOS information includes positive and negative values, the FIOS information including "0.0" as the deepest portion and "1.0" as the highest position is obtained by setting the minimum value (negative value) of the FIOS information to "0.0" and performing normalization.

The normal map generation unit 307 acquires a change in height from the height map FIOS1, and generates the normal map FIOS2 which stores, in each pixel, vector information (the unit vector of the normal) based on the change in height. Note that the example in which the normal map is created from the height map has been explained. However, a normal map may be created based on information from which the height information $\lambda$-h can be acquired, or a normal map may be directly input.

The rendering processing unit 309 generates, from the light-source information, an illumination map which stores vector information, similarly to the normal map FIOS2. Each pixel of the illumination map stores a vector which faces the light source and has a length corresponding to an amount of incident light. By obtaining the inner product of the vectors of the corresponding pixels of the normal map FIOS2 and the illumination map, the luminance value of a pixel to be rendered is calculated.

[Rendering Process]

Figure 6:
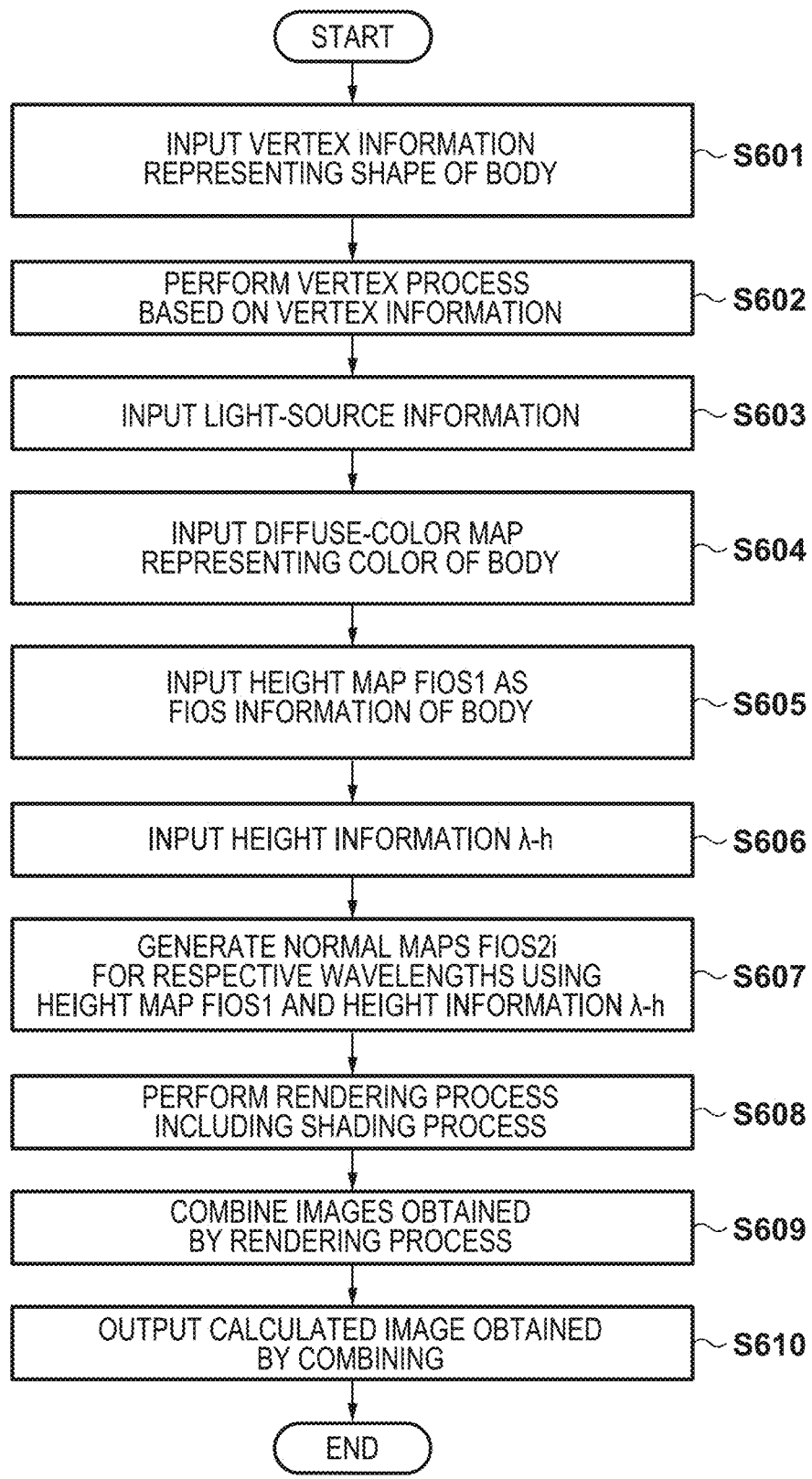
FIG. 6 is a flowchart for explaining the rendering process executed by the image processing device.

The rendering process executed by the image processing device will be described with reference to a flowchart shown in FIG. 6. The input unit 301 inputs vertex information representing the shape of the body to be rendered (step S601). The vertex processing unit 306 performs a vertex process based on the input vertex information (step S602). The vertex process includes CG processes such as a vertex shader, clipping, perspective transformation, and viewport transformation. These methods are known and a description thereof will be omitted.

The input unit 302 inputs the light-source information (step S603). The light-source information indicates spectral radiance as brightness information for each wavelength of the light source, and a light source position on a virtual space. The input unit 303 inputs the diffuse-color map representing the color of the body to be rendered (step S604). The input unit 304 inputs the height map FIOS1 as the FIOS information of the body to be rendered (step S605). The input unit 305 inputs the height information $\lambda$-h (step S606). Note that the input order of the pieces of information is merely an example. The present invention is not limited to this and the pieces of information can be input in an arbitrary order.

The height information $\lambda$-h will be described with reference to FIGS. 7A, 7B, and 7C. The height information $\lambda$-h indicates the relationship between a wavelength and the maximum height value of the height map. FIG. 7A shows an example of the height information $\lambda$-h, and shows data in a table format, which indicates a maximum height value h of the height map at a wavelength $\lambda i$. If, for example, wavelengths w1, w2, and w3 respectively correspond to red (R), green (G), and blue (B) components, a relationship of w1>w2>w3 holds. In this case, a relationship of h1<h2<h3 is set as the relationship between the maximum height values corresponding to the respective wavelengths. That is, the height information $\lambda$-h is normally information including the smaller maximum value h at a longer wavelength and the larger maximum value h at a shorter wavelength. By setting a relationship of h1=h2=h3 as the relationship between the maximum height values, it is possible to prohibit the process of the brightness increase of a covering portion by an opaque body or an opaque body on a translucent body.

Changes in orientations of the normal vectors depend on the tilt of the slant, as shown in FIGS. 4A, 4B, and 4C. As shown in FIG. 7B, if the maximum value h is small and the tilt is small, the orientations of the normal vectors present a distribution close to that of orientations (broken arrows in FIG. 7B) perpendicular to the plane. On the other hand, if the maximum value h is large and the tilt is large, the orientations of the normal vectors present a more dispersed distribution. Therefore, changes in orientations of the normal vectors can be made smaller by setting the maximum value h to a smaller value for longer-wavelength light, and can be made larger by setting the maximum value h to a larger value for shorter-wavelength light. In other words, by giving a difference between the maximum height values h with respect to the wavelengths $\lambda$, the brightness increase of the FIOS (serving as the shadow portion when there is no internally-scattered light) is obtained in a pixel value calculation process (to be described later).

FIG. 7C shows the relationship between the value (abscissa) of the height map FIOS1 when generating the height map FIOS1$i$ using the height information $\lambda$-h shown in FIG. 7A and the value (ordinate) of the height map FIOS1$i$. Note that the definition of the relationship between the value of the height map and the height is not limited to the table format, and the relationship may be defined using a polynomial or the like.

Next, the normal map generation unit 307 generates the normal maps FIOS2 for the respective wavelengths using the height map FIOS1 and the height information $\lambda$-h (step S607). The calculated image generation unit 308 performs the pixel value calculation process (rendering process) including the shading process using the information input or generated in steps S602 to S607, thereby rendering shading process images as objects for the respective wavelengths $\lambda i$ (step S608). The calculated image generation unit 308 then combines the shading process images as the objects for the respective wavelengths $\lambda i$ (step S609), and outputs, via the output unit 311, a calculated image obtained by combining (step S610). The calculated image representing the body to be rendered is displayed by the display unit 205 on the monitor 207 or stored in the storage unit 203 or the like.

Normal Map Generation Unit

Figure 8:
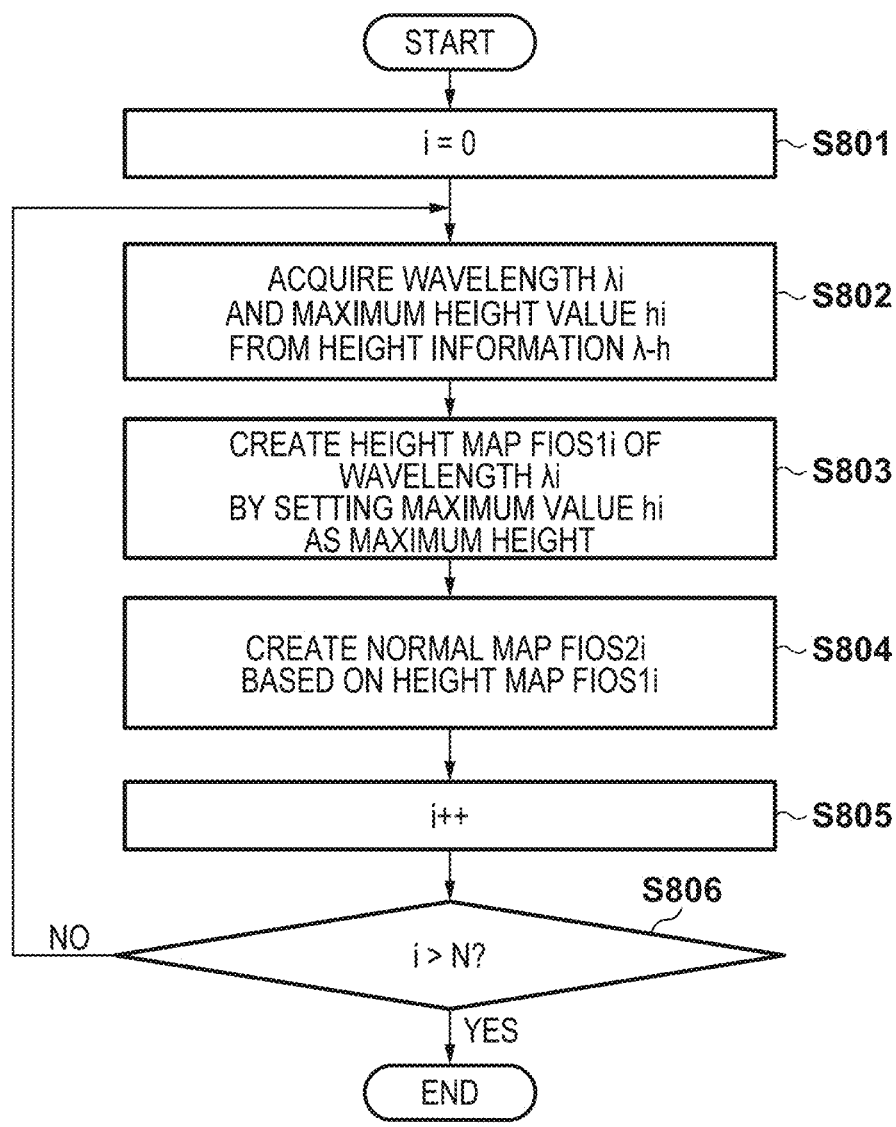
FIG. 8 is a flowchart for explaining a process of generating normal maps for respective wavelengths by a normal map generation unit.

The process (step S607) of generating the normal maps for the respective wavelengths by the normal map generation unit 307 will be described with reference to a flowchart shown in FIG. 8. The normal map generation unit 307 initializes a counter i to 0 (step S801), and obtains the ith wavelength λi and the maximum height value hi from the height information λ-h (step S802). For example, if the height information λ-h shown in FIG. 7A is input, the wavelength w1 and the maximum value h1 are obtained first. Subsequently, the normal map generation unit 307 creates the height map FIOS1*i* of the wavelength λi by setting the maximum value hi as the maximum height (step S803), and creates the normal map FIOS2*i* of the wavelength λi based on the height map FIOS1*i* (step S804). Note that the corresponding wavelength λi is recorded as the header information of the normal map FIOS2*i*.

Next, the normal map generation unit 307 increments the counter i (step S805), and determines, by comparing the counter value i with a wavelength count N of the height information λ-h, whether to terminate the process of generating the normal maps for the respective wavelengths (step S806). That is, if i≤N, the process returns to step S802 to create a normal map for the next wavelength λi. Alternatively, if i>N, the process of generating the normal maps for the respective wavelengths is terminated.

Calculated Image Generation Unit

The calculated image generation process (steps S608 and S609) by the calculated image generation unit 308 will be described with reference to a flowchart shown in FIG. 9. In the calculated image generation unit 308, the rendering processing unit 309 generates an illumination map based on the light-source information (step S901), and initializes the counter i to 0 (step S901). The rendering processing unit 309 acquires the wavelength λi from the header information of the normal map FIOS2*i* (step S902), and extracts a diffuse-color map corresponding to the wavelength λi from the input diffuse-color map (step S903). The rendering processing unit 309 performs the rendering process including the shading process using the vertex process result, the illumination map, the diffuse-color map corresponding to the wavelength λi, and the normal map FIOS2*i*, thereby generating a shading process image as an object of the wavelength λi (step S904).

The shading process image for each wavelength corresponds to, for example, a grayscale image of an R, G, or B component. Note that the wavelength λi is not limited to the dominant wavelength of the R, G, or B component. Only three or more wavelengths are necessary, and it is only necessary to obtain a full-color image by combining the shading process images of the respective wavelengths λi.

Figures 10A, 10B, 10C:
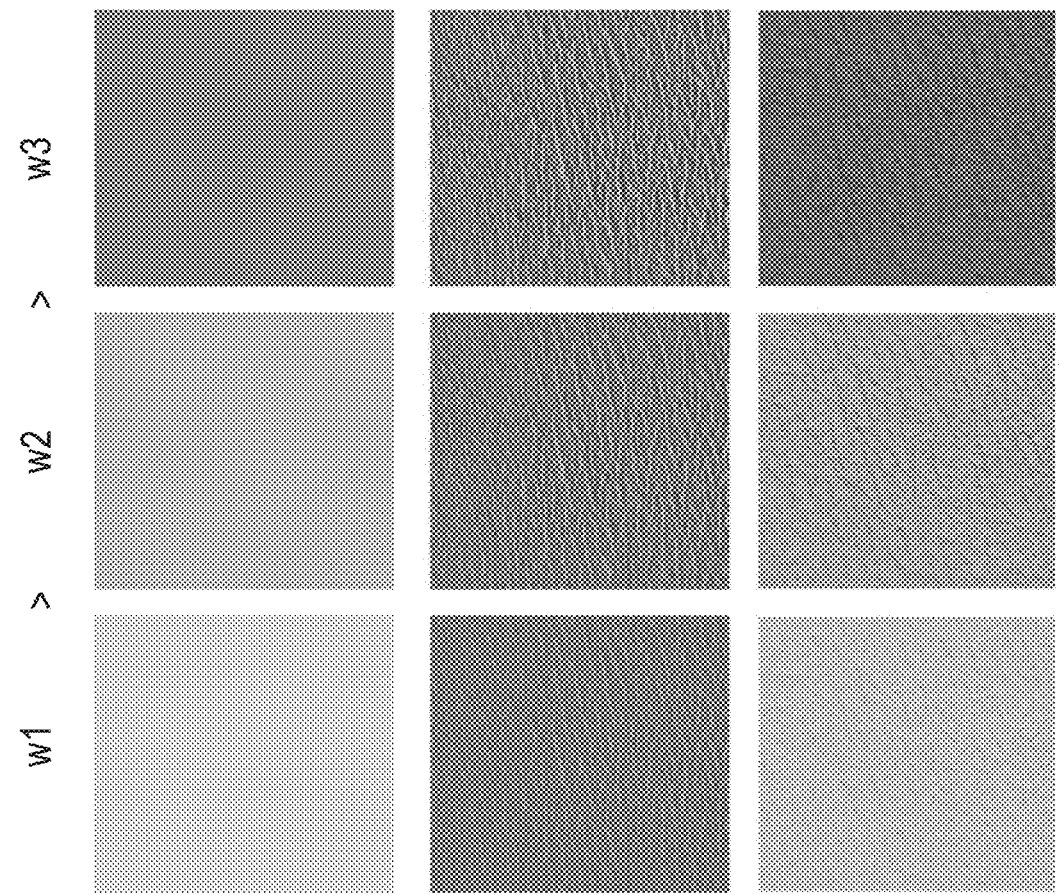
FIGS. 10A, 10B, and 10C are views for explaining a shading process.

The shading process will be described with reference to FIGS. 10A, 10B, and 10C. FIG. 10A shows the diffuse colors of the wavelengths w1, w2, and w3. Note that the wavelengths have the relationship of w1>w2>w3, as described above. FIG. 10B shows the normal maps FIOS2*i* respectively corresponding to the wavelengths w1, w2, and w3. As described above, since the heights corresponding to the respective wavelength have the relationship of h1≤h2≤h3, a change in orientation of the vector at the wavelength w1 is smaller than that in orientation of the vector at the wavelength w3 in the normal maps FIOS2*i*. FIG. 10C shows the shading process images created in step S905. By using, for longer-wavelength light, the normal map FIOS2*i* in which a change in orientation of the vector is smaller, the brightness of the FIOS at the wavelength w1 increases, as compared with the brightness of the FIOS at the wavelength w3, thereby obtaining the brightness increase shown in FIG. 10C.

Next, the rendering processing unit 309 increments the counter i (step S905), and determines, by comparing the count value i with the number N of normal maps FIOS2, whether to terminate the rendering process (step S906). That is, if i≤N, the process returns to step S902 to perform the rendering process for the next wavelength λi. Alternatively, if i>N, the rendering process is terminated. If the rendering process is terminated, the image combining unit 310 generates a color image as a calculated image by combining the shading process images of the respective wavelengths λi (step S907), thereby terminating the calculated image generation process.

As described above, the brightness increase of the FIOS (serving as the shadow portion when there is no internally-scattered light) can reconstruct the feature in which the FIOS becomes red and bright, thereby faithfully reconstructing a translucent body having the internal scattering characteristic.

The example in which the height map FIOS1 input as the first surface fine irregularity information is converted into the normal maps FIOS2*i* for the respective wavelengths as pieces of second surface fine irregularity information has been explained above. However, the first surface fine irregularity information and the second surface fine irregularity information are not limited to the height map and the normal map, respectively. For example, any information including FIOS information, such as distance information measured by a camera, a distance measurement device, or the like, is usable. For conversion from FIOS1 into FIOS2*i*, not only a method of changing the height of the height map but also a method of performing, for FIOS1, blurring processes different for the respective wavelengths is usable.

Second Embodiment

An image processing device and an image processing method according to the second embodiment of the present invention will be described below. Note that in the second embodiment, the same reference numerals as in the first embodiment denote almost the same components and a detailed description thereof may be omitted.

If the process according to the first embodiment is performed, since the shape of the FIOS is different for each wavelength, the size and shape of a glossy portion are different to some extent for each wavelength, which may appear as a color shift after combining. In the second embodiment, a color shift in a glossy portion is eliminated by additionally calculating a glossy portion from one normal map, and combining an image of the glossy portion and shading process images.

Figure 11:
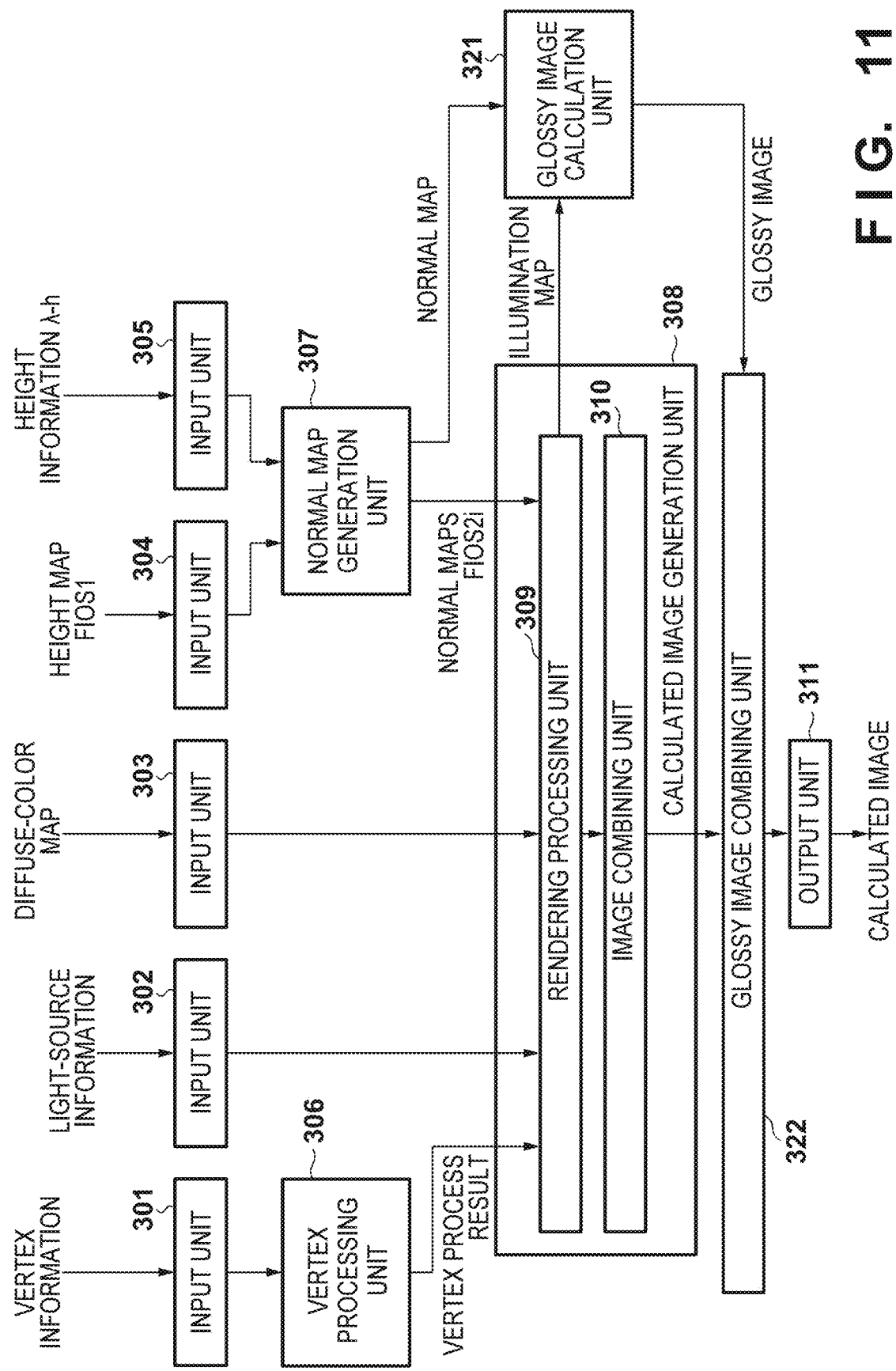
FIG. 11 is a block diagram showing an example of the processing arrangement of an image processing device according to the second embodiment.

FIG. 11 is a block diagram showing an example of the processing arrangement of the image processing device. The arrangement of the image processing device according to the second embodiment is obtained by adding a glossy image calculation unit 321 and a glossy image combining unit 322 to the arrangement shown in FIG. 3. The glossy image calculation unit 321 renders a glossy image using one normal map FIOS2*i* acquired from a normal map generation unit 307 and an illumination map acquired from a rendering processing unit 309, and outputs the glossy image to the glossy image combining unit 322.

The glossy image combining unit 322 generates a calculated image by combining a combined image of shading process images input from a calculated image generation unit 308 and the glossy image input from the glossy image calculation unit 321. Note that if the combined image of the shading process images already includes a glossy portion, the glossy image combining unit 322 performs a process of, for example, deleting the glossy portion, and then combines the glossy image with the combined image of the shading process images.

Figure 12:
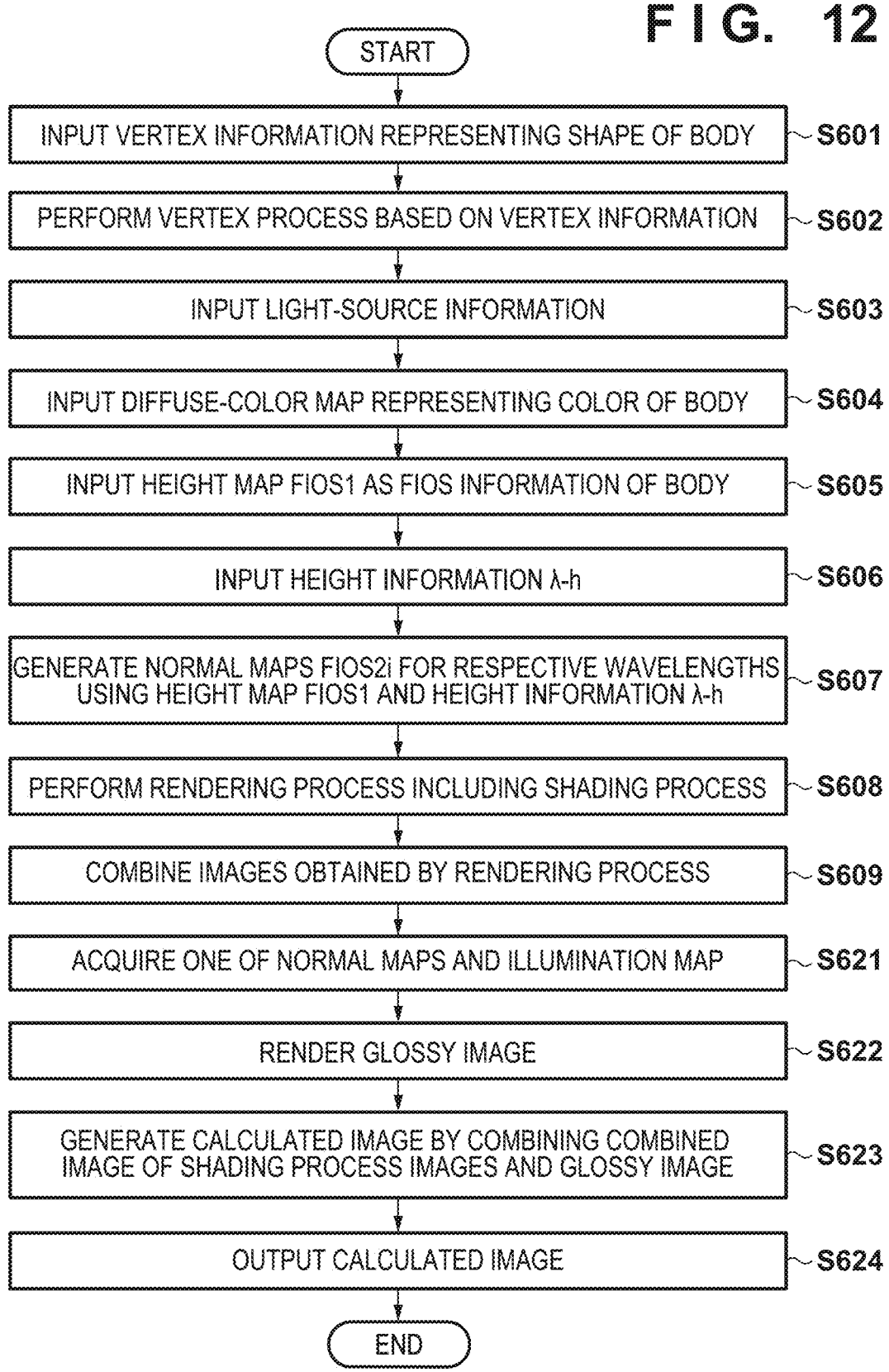
FIG. 12 is a flowchart for explaining a rendering process executed by the image processing device.

A rendering process executed by the image processing device according to the second embodiment will be described with reference to a flowchart shown in FIG. 12. Processes in steps S601 to S609 are the same as in the first embodiment and a detailed description thereof will be omitted. The glossy image combining unit 322 acquires the illumination map and one of the normal maps FIOS2$i$ created by the normal map generation unit 307 (step S621), and renders a glossy image using them (step S622).

Next, the glossy image combining unit 322 generates a calculated image by combining the combined image of the shading process images input from the calculated image generation unit 308 and the glossy image input from the glossy image calculation unit 321 (step S623), and outputs the calculated image via an output unit 311 (step S624). The calculated image is displayed by a display unit 205 on a monitor 207, or stored in a storage unit 203 or the like. As described above, the color shift in the glossy portion can be resolved.

Third Embodiment

An image processing device and an image processing method according to the third embodiment of the present invention will be described below. Note that in the third embodiment, the same reference numerals as in the first and second embodiments denote almost the same components and a detailed description thereof may be omitted.

Figure 13A:
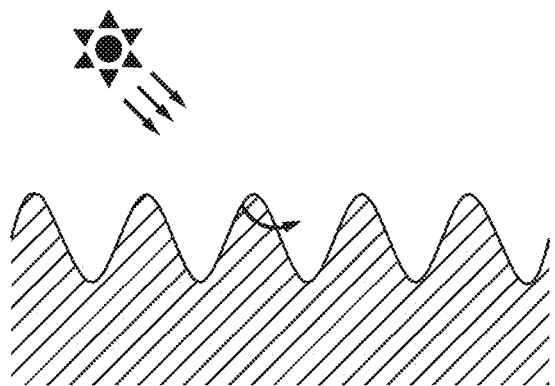
FIGS. 13A and 13B are views schematically showing entering of internally-scattered light.
Figure 13B:
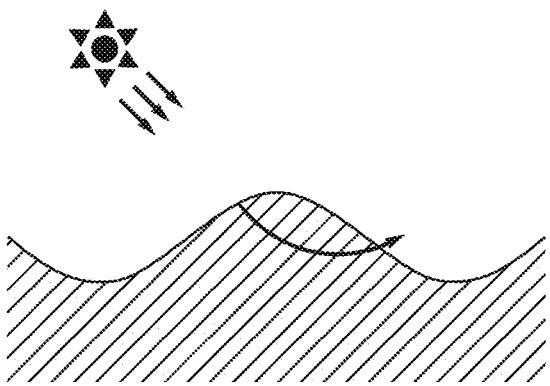

As the third embodiment, a method of selectively applying a translucent body reconstruction method to an area (to be referred to as a high-frequency area hereinafter) where the spatial frequency of an FIOS is high and the influence of internally-scattered light becomes conspicuous will be described. FIGS. 13A and 13B each schematically show entering of internally-scattered light. FIG. 13A shows entering of internally-scattered light in a translucent body (to be referred to as a high-frequency body hereinafter) in which the spatial frequency of an FIOS is high, and FIG. 13B shows entering of internally-scattered light with respect to a translucent body (to be referred to as a low-frequency body hereinafter) in which the spatial frequency of an FIOS is low.

As shown in FIG. 13A, the moving distance of light inside the high-frequency body is short. On the other hand, as shown in FIG. 13B, the moving distance of light inside the low-frequency body is long. Since an amount of absorbed light increases depending on the moving distance of light, an amount of light exiting from the high-frequency body is larger and an amount of light exiting from the low-frequency body is smaller. Therefore, in the low-frequency body shown in FIG. 13B, internally-scattered light exits not to the extent that the brightness increase is required. Consequently, it can be effective to selectively apply the translucent body reconstruction method to the high-frequency area which is more significantly influenced by internally-scattered light.

Figure 14:
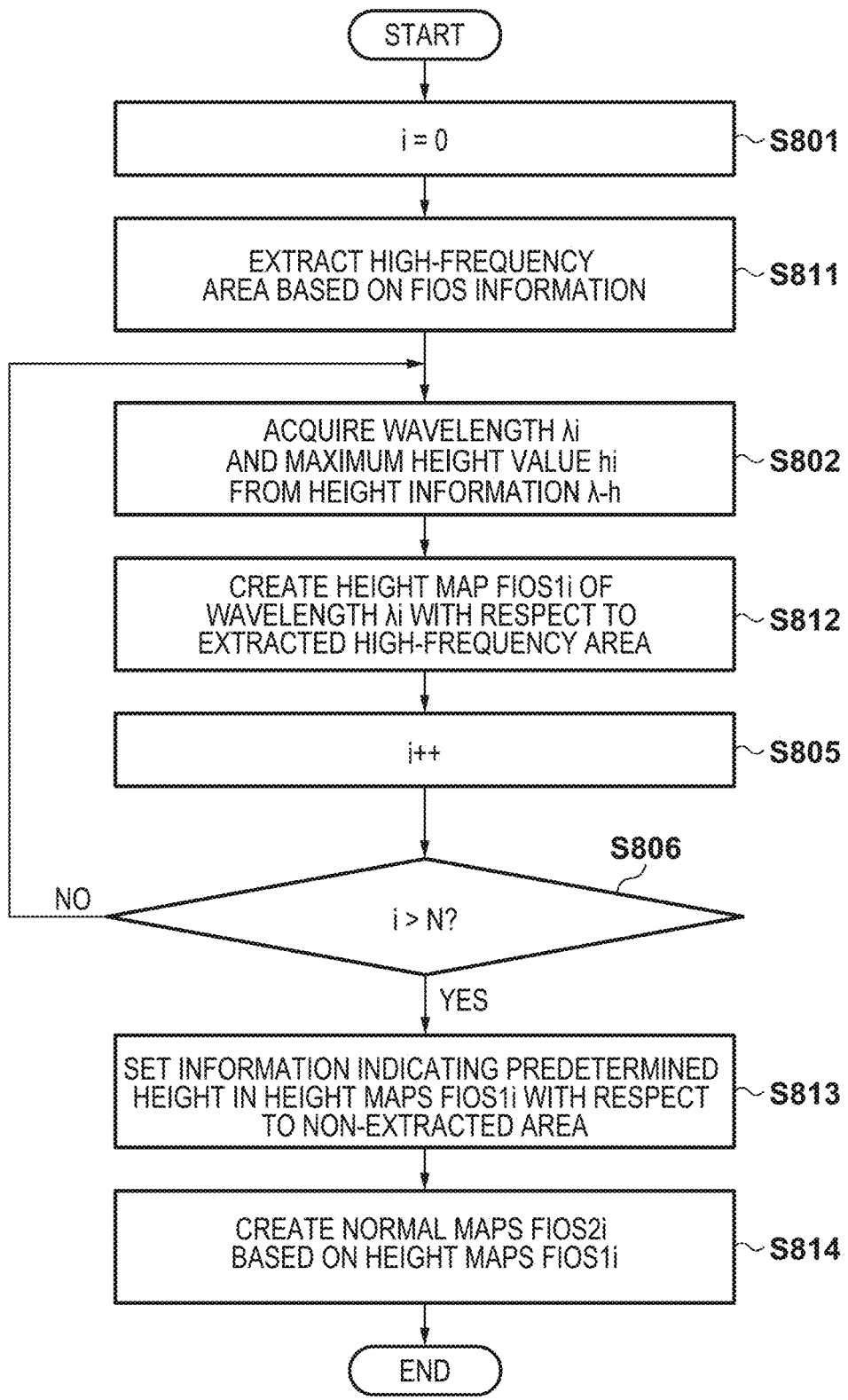
FIG. 14 is a flowchart for explaining a process of creating a normal map for each wavelength including a high-frequency area selection process according to the third embodiment.

A process (step S607) of creating normal maps for respective wavelengths including a high-frequency area selection process will be described with reference to a flowchart shown in FIG. 14. After initializing a counter i (step S801), the normal map generation unit 307 extracts a high-frequency area based on FIOS information (for example, a height map FIOS1) (step S811). Subsequently, the normal map generation unit 307 acquires an ith wavelength $\lambda i$ and a maximum height value hi from height information $\lambda$-h (step S802), and creates a height map FIOS1$i$ of the wavelength $\lambda i$ with respect to the extracted high-frequency area (step S812). Processes in steps S805 and S806 are the same as in the first embodiment and a detailed description thereof will be omitted.

If the determination result in step S806 satisfies i>N, the normal map generation unit 307 sets, in the height maps FIOS1$i$ of the respective wavelengths $\lambda i$, information indicating a predetermined height (for example, the height of a reference surface) with respect to a non-extracted area which has not been extracted as a high-frequency area (step S813). The normal map generation unit 307 creates the normal maps FIOS2$i$ of the respective wavelengths $\lambda i$ based on the height maps FIOS1$i$ of the respective wavelengths $\lambda i$ (step S814), and terminates the process of generating the normal maps for the respective wavelengths.

As described above, the height maps FIOS1$i$ in which the maximum heights for the respective wavelengths are different with respect to the high-frequency area and the pieces of height information match each other with respect to the non-extracted area are created. Thus, it is possible to selectively apply the translucent body reconstruction method to the area where the spatial frequency of the FIOS is high and the influence of internally-scattered light becomes conspicuous.

[Modification]

For example, if the light source includes no long-wavelength light or the diffuse-color map includes no color in a long-wavelength range, the brightness increase is not observed, or even if the brightness increase is observed, a slight brightness increase may be observed. To reduce the load of the process of reconstructing the brightness increase in this case, the normal map generation unit 307 may determine whether to create the normal maps FIOS2$i$ for the respective wavelengths based on the diffuse-color map and the light-source information. If no normal maps FIOS2$i$ for the respective wavelengths are created, the normal map generation unit 307 outputs the normal map FIOS2 corresponding to the height map FIOS1.

The above description assumes that the body to be rendered is a translucent body. If part of the translucent body is covered with an opaque body, the uncovered portion of the translucent body, which is not covered with the opaque body, falls within the application range of the reconstruction method according to the first to third embodiments. In this case, the covered portion may fall outside the application range of the reconstruction method, or may be considered as an area where no normal maps FIOS2$i$ for the respective wavelengths are created, and applied with the same reconstruction method as that for the uncovered portion.

If light enters, at a shallow angle (an angle close to an incident angle of 90°), the surface of the body to be rendered, the influence of internally-scattered light on the appearance becomes smaller than that of reflected light. Therefore, similarly to the high-frequency area in the third embodiment, it is also effective to extract an area (low-incident angle area) where the incident angle of illumination light entering the surface of the body to be rendered is smaller than a predetermined angle. In this case, the height maps FIOS1$i$ in which the maximum heights for the respective wavelengths are different with respect to the extracted area and the pieces of height information match each other with respect to the non-extracted area are created, and the normal maps FIOS2$i$ of the respective wavelengths $\lambda i$ are created based on the height maps FIOS1$i$ of the respective wavelengths $\lambda i$. Therefore, it is possible to selectively apply the translucent body reconstruction method to the low-incident angle area in which the influence of internally-scattered light becomes conspicuous.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-008281, filed Jan. 19, 2016 which is hereby incorporated by reference herein in its entirety.

What is claimed is:

1. An image processing device comprising:
one or more processors and/or circuitry, configured to act as units comprising:
(1) an input unit configured to input a color image representing color of an object, the color image having a plurality of color components; and
(2) a generation unit configured to generate an output image by changing shading of a surface of the object in the color image,
wherein the generation unit generates the output image so, in a region of a human skin of the object in the color image, (a) a difference between brightness corresponding to a concave portion in a surface of the human skin and brightness corresponding to a convex portion in the surface of the human skin becomes larger in the output image than in the color image, and (b) at least a part of the concave portion becomes redder in the output image than in the color image.

2. The image processing device according to claim 1, wherein at least a part of a shadow portion of the object in the output image is redder and brighter than a region in the color image which corresponds to the shadow portion.

3. The image processing device according to claim 2, wherein the shadow portion of the object is a shadow portion occurring on a fine irregularity on a surface of the object.

4. The image processing device according to claim 1, wherein the plurality of color components are red, blue, and green, and
wherein each pixel of the color image has pixel values, each of the pixel values being for a respective one of the plurality of color components.

5. The image processing device according to claim 4, wherein the generation unit executes a shadowing process so that, for at least a part of the pixels of the region of the human skin in the color image, a ratio of a pixel value of red is greater than ratios of pixel values of blue and green.

6. The image processing device according to claim 4, wherein a degree of a change from the color image to the output image is different for each of the plurality of color components.

7. The image processing device according to claim 1, wherein a change of the shading is different between the region of the human skin in the color image and a region other than the region of the human skin in the color image.

8. The image processing device according to claim 1, wherein the generation unit changes the shading of the surface of the object in the color image due to influence of a light source from one direction.

9. The image processing device according to claim 1, wherein the generation unit generates the output image so as to, in at least a part of the concave portion in the region of the human skin of the object in the color image, emphasize red of red, green, and blue included in a light source for changing the shading.

10. An image processing method comprising:
inputting a color image representing color of an object, the color image having a plurality of color components; and
generating an output image by changing shading of a surface of the object in the color image,
wherein the generating, generates the output image so, in a region of a human skin of the object in the color image, (a) a difference between brightness corresponding to a concave portion in a surface of the human skin and brightness corresponding to a convex portion in the surface of the human skin becomes larger in the output image than in the color image, and (b) at least a part of the concave portion becomes redder in the output image than in the color image.

11. A non-transitory computer-readable storage medium storing a computer program for causing a computer to execute an image processing method, the method comprising:
inputting a color image representing color of an object, the color image having a plurality of color components; and
generating an output image by changing shading of a surface of the object in the color image,
wherein the generating generates the output image so, in a region of a human skin of the object in the color image, (a) a difference between brightness corresponding to a concave portion in a surface of the human skin and brightness corresponding to a convex portion in the surface of the human skin becomes larger in the output image than in the color image, and (b) at least a part of the concave portion becomes redder in the output image than in the color image.

* * * * *